G. W. SAWIN.
Attaching Wheels to Axles.
No. 77,220. Patented April 28, 1868.
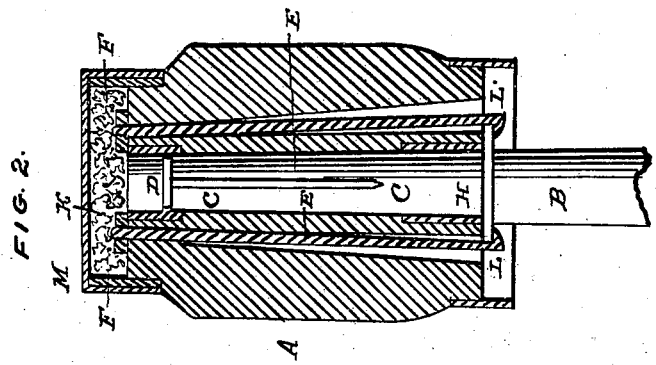
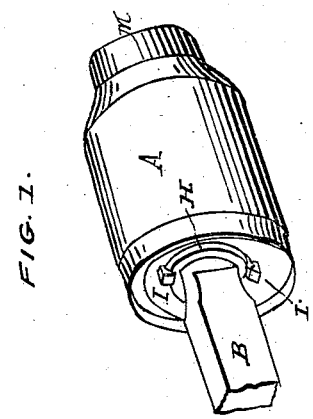
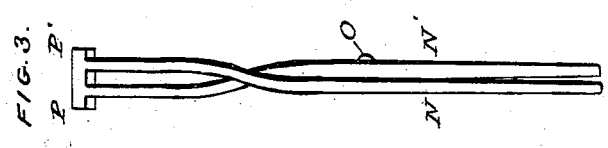
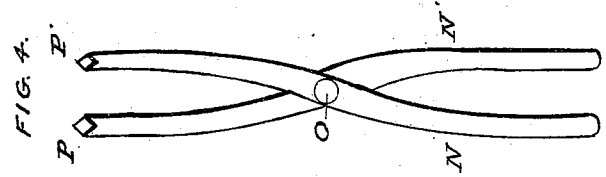
WITNESSES: INVENTOR.

United States Patent Office.

GEORGE W. SAWIN, OF NASHUA, NEW HAMPSHIRE.

Letters Patent No. 77,220, dated April 28, 1868.

IMPROVEMENT IN ATTACHING WHEELS TO AXLES.

The Schedule referred to in these Letters Patent and making part of the same.

TO ALL WHOM IT MAY CONCERN:

Be it known that I, GEORGE W. SAWIN, of Nashua, in the county of Hillsboro, and State of New Hampshire, have invented certain new and useful Improvements in the Method of Attaching Wheels to Axles; and I do hereby declare that the following is a full and exact description thereof, reference being had to the accompanying drawings, and to the letters of reference marked thereon.

The nature of my invention consists in attaching to the hub two spring-latches, arranged in such a manner that when the hub is placed upon the axle the latches shall catch over the edge of a ring, which is permanently fixed upon the axle; also in arrangement for lubricating.

To enable others skilled in the art to make and use my invention, I will proceed to describe its construction and operation.

In the drawings—

Figure 1 is a perspective view, showing the hub and a portion of the axle; also the ends of the spring-latches and the ring.

Figure 2 is a sectional view of the same.

Figures 3 and 4 represent in front and side elevation a pair of peculiarly-formed tongs, which are used for the purpose of springing the latches back when it is desirable to remove the hub.

A represents a hub of ordinary construction, having inserted within and permanently attached to it the spring-latches E E'; the said latches having hooks L L' at one end, and being secured to the hubs by nuts F F at the opposite ends. H is a ring, attached permanently to the axle B, over the edge of which the hooks L L' catch, as shown in figs. 1 and 2.

The end of the axle within the hub is provided with channels D C' C, fig. 2, in which the surplus lubricating-matter may remain.

M represents a cap, which may be packed with cotton-waste, or some similar material, K, fig. 2, which may serve as a reservoir of oil for lubricating the axle.

As the ends of the latches E E' form an incline, as shown at L, the hub may be slipped on the end of the axle, the latches being thrown back by simply coming in contact with the ring H, so as to pass over it and then snap into place.

To facilitate removing the hub from the axle, I use a peculiarly-formed tongs, shown in figs. 3 and 4, each leg of the tongs being provided with a short prism, P P'.

To remove the hub, I so place the tongs upon the axle that one of the prisms P P' shall be in contact with L, and the other with L'. Now, by holding them firmly against the ring H, and at the same time turning the wheel, the hooks L L' will be pushed outward until they are free from the ring H, when the hub may be removed from the axle.

Having thus described my invention, I will now proceed to set forth my claims.

What I claim my invention, and desire to secure by Letters Patent, is—

The combination of the latches E E' with the hub A and ring H, made substantially as described and for the purpose set forth.

GEORGE W. SAWIN.

Witnesses:
   A. HUN BERRY,
   FRANK G. PARKER.